United States Patent [19]
Oliver

[11] Patent Number: 5,913,056
[45] Date of Patent: Jun. 15, 1999

[54] REMOTE PROGRAMMING OF MICROPROCESSOR EQUIPMENT OVER A STANDARD SERIAL PORT

[75] Inventor: James A. Oliver, Webster, N.Y.

[73] Assignee: Eastman Kodak Company, Rochester, N.Y.

[21] Appl. No.: 08/719,936

[22] Filed: Sep. 25, 1996

[51] Int. Cl.⁶ .................................................. G06F 9/00
[52] U.S. Cl. ............................................. 395/651; 395/652
[58] Field of Search ................................. 395/651, 652, 395/653, 570

[56] References Cited

U.S. PATENT DOCUMENTS

| | | | |
|---|---|---|---|
| 5,325,529 | 6/1994 | Brown et al. | 395/700 |
| 5,579,522 | 11/1996 | Christeson et al. | 395/652 |
| 5,694,583 | 12/1997 | Williams et al. | 395/500 |
| 5,701,492 | 12/1997 | Wadsworth et al. | 395/712 |
| 5,729,683 | 3/1998 | Le et al. | 395/200.01 |

*Primary Examiner*—Dennis M. Butler
*Attorney, Agent, or Firm*—Nelson Adrian Blish; David A. Novais

[57] ABSTRACT

A method and apparatus for reprogramming a microprocessor through a serial port (18) is disclosed. An administrative computer (14) is connected to a serial port (18) on a machine (12) containing the microprocessor to be reprogrammed. A first sequence of signals is sent from the administrative computer (14) to the microprocessor (30) to change the microprocessor from a normal mode to a bootstrap mode. A new program is then loaded from the administrative computer (14) to the microprocessor (30). A second sequence of signals is sent from the administrative computer (14) to the microprocessor (30) to change the microprocessor (30) from the bootstrap mode to the normal mode.

8 Claims, 8 Drawing Sheets

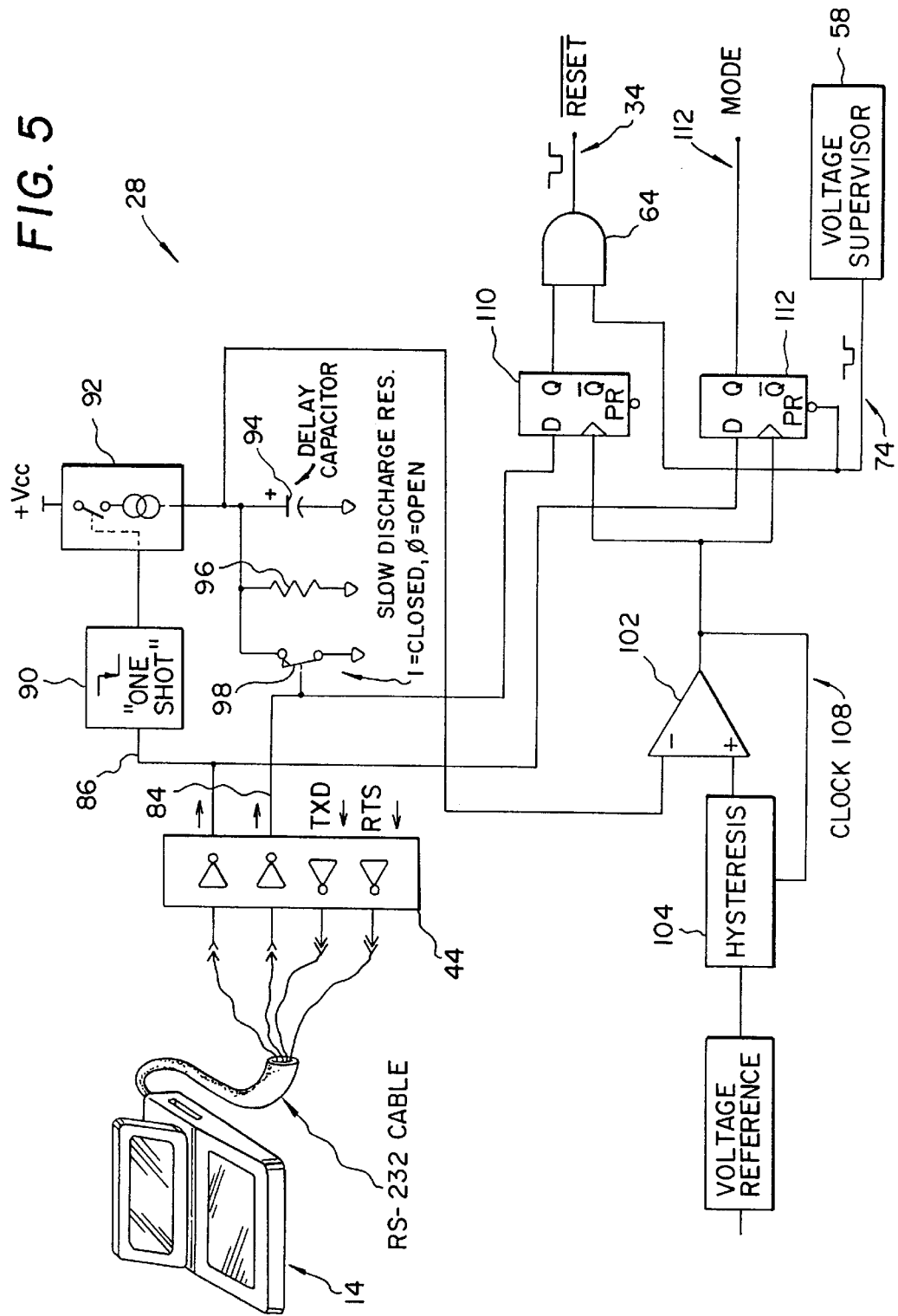

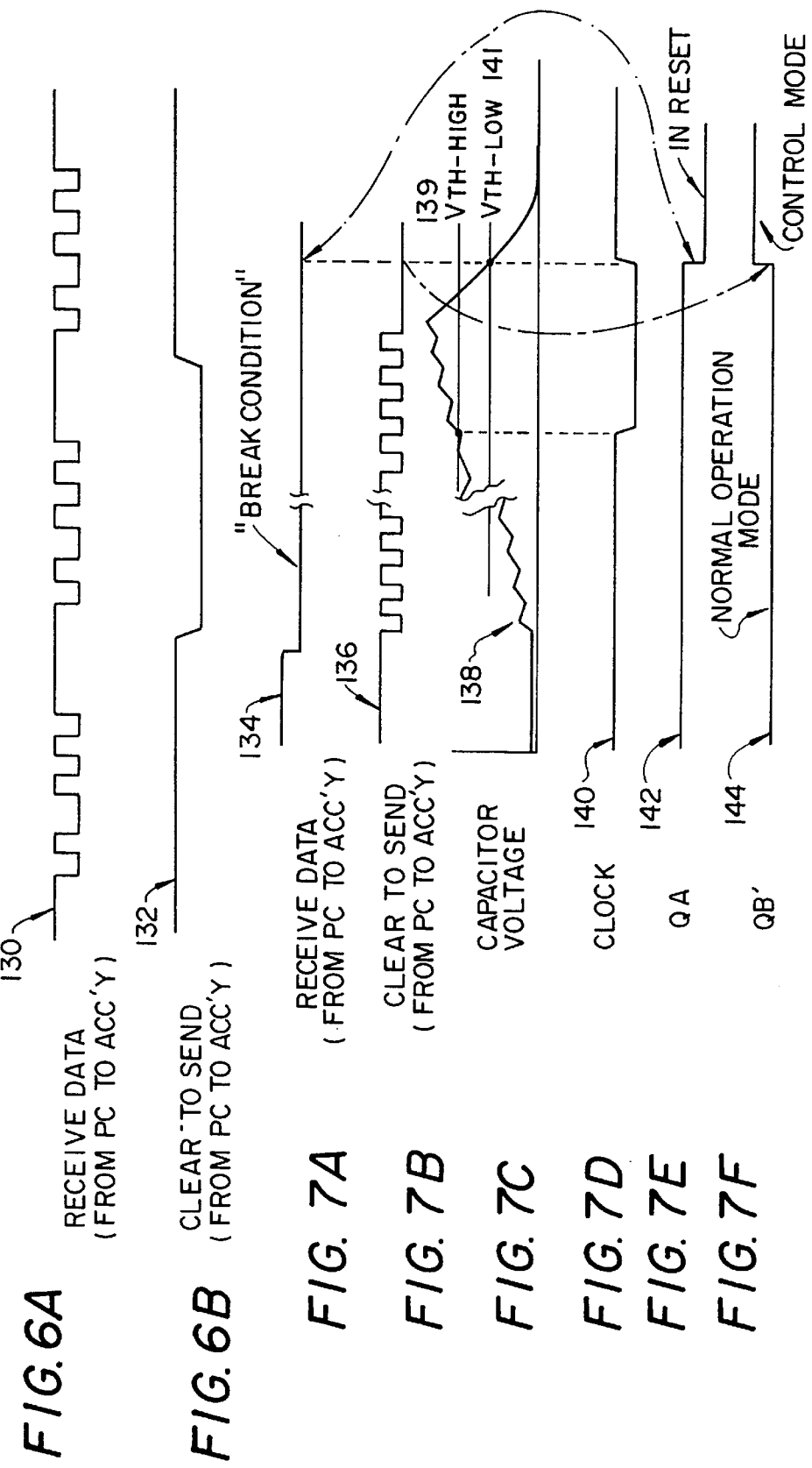

REMOTE PROGRAMMING OF MICROPROCESSOR EQUIPMENT OVER A STANDARD SERIAL PORT

BACKGROUND OF THE INVENTION

1. Field of the Invention

The present invention relates to microprocessors in general and in particular to a system for reprogramming a microprocessor through a standard serial port.

2. Background of the Invention

Printed circuit boards are built into many machines which contain microprocessors, EPROM chips, or other memory devices, which perform a variety of specialized functions. Such machines may include, but are not limited to, printers, copiers, or other dedicated devices.

Many microprocessors require that operational code, called firmware, be loaded into a programmable memory during manufacturing. This is accomplished using a device programmer. The programmed microprocessor is then installed into the printed circuit board. This separate programming results in higher costs for labor, and requires additional programmable device sockets on the circuit board. The separate programming also reduces the overall reliability of the board due to human error in programming the devices, and socket and interconnect failures.

Higher costs are also incurred for new software program upgrades in the field because the machine must be disassembled to gain access to the printed circuit board. The microprocessor is removed from the circuit board, reprogrammed, replaced on the circuit board, and the machine is re-assembled. Use of diagnostic programs to detect and correct malfunctions after manufacture is also a problem. For example, if a problem occurs the machine frequently must be disassembled to load a diagnostic program to analyze the system for non-functional components.

Thus, it would be desirable to load firmware upgrades, calibration data, customer specific information, preferences, or configuration selections into the machine with little or no disassembly. Some prior art attempts to solve this problem have used a floppy disk drive, or tape drive, to load the required data. These systems, however, are costly and significantly increase the price of the machine. Some printed circuit boards use flash memory and have a "boot block flash" wherein a block of the flash is never erased. The intent of this system is that the boot block section of the firmware would always be resident to load new code. However, the problem of initial device programming still exists in this system because something must program the boot block flash with the new firmware.

SUMMARY OF THE INVENTION

An object of the present invention is to provide a simple means of reconfiguring a programmable microprocessor without disassembly of the equipment containing the microprocessor.

This invention is for a system that seizes control of a microprocessor by a sequence of signals transmitted from an administrative computer through a serial port to a microprocessor located on a circuit board. Using two signals, the microprocessing mode is changed from a normal mode to a "bootstrap" mode by a sequence of signals. A new program is loaded into the microprocessor while the microprocessor is in the bootstrap mode. The microprocessor is then reset to the normal mode by another sequence of signals. The sequence of signals is transmitted over the serial port in a manner that does not occur in a normal data transmission.

In an alternative embodiment for microprocessors that can not support a new program download by the bootstrap method described above, a preinstalled program transfers functional control of the microprocessor to the serial port when the sequence of signals is received. The new program is then loaded into the microprocessor's random access memory (RAM) and executed to perform a variety of functions such as system tests, entry of calibration data, or reprogramming of the operational firmware.

The hardware required for implementation of this invention consists of additional circuitry that is completely removed from the normal functions of the microprocessor. This additional circuitry constantly monitors the state of a handshake line and a receive data line into the printed circuit board while waiting for the proper sequence of signals. After being placed in the "bootstrap" mode, a special program in the core of the microprocessor forces the microprocessor to load the new program over the serial port and transfer execution from the program in the core of the microprocessor to the new program. At this point, the user has the appropriate supporting program executing on the administrative PC and a separate program executing in the microprocessor on the printed circuit board. The administrative PC and the microprocessor can then communicate over the port to provide the previously mentioned functions.

BRIEF DESCRIPTION OF THE DRAWINGS

FIG. 5 shows a block diagram of an analog embodiment of the control grabber hardware circuit and interface to the administrative PC.

FIGS. 6A–6B show timing diagrams for a normal data exchange.

FIGS. 7A–7F show timing data diagrams and the sequence of signals to the control grabber circuit for one state change.

DETAILED DESCRIPTION OF THE PREFERRED EMBODIMENTS

Figure 1:
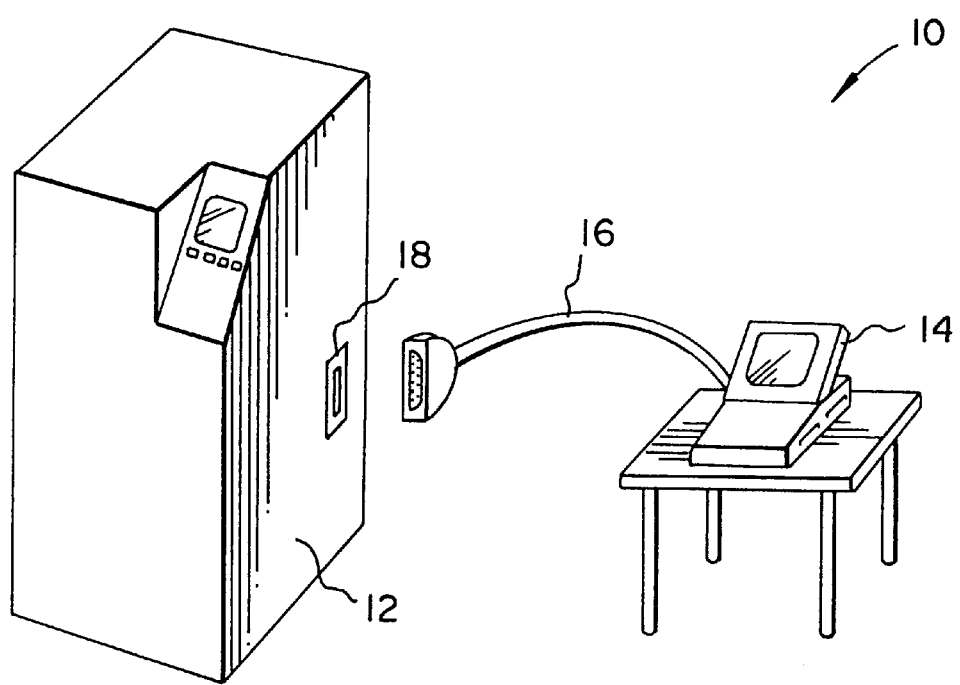
FIG. 1 shows a perspective view of a system for reprogramming a microprocessor according to the present invention.

Referring now to FIG. 1, a system for reprogramming a microprocessor is referred to in general by the numeral 10. The system consists of an administrative computer 14 connected to a machine 12 containing a microprocessor via a serial cable 16.

Many machines, including computers, contain microprocessors which provide data, perform services, or act on commands provided over a standard serial port 18. These serial ports are referred to as RS-232 serial ports and conform to industry standards. These ports consists of at least two serial data communications lines, one for data out of and one for data into the machine containing the microprocessor.

Figure 2:
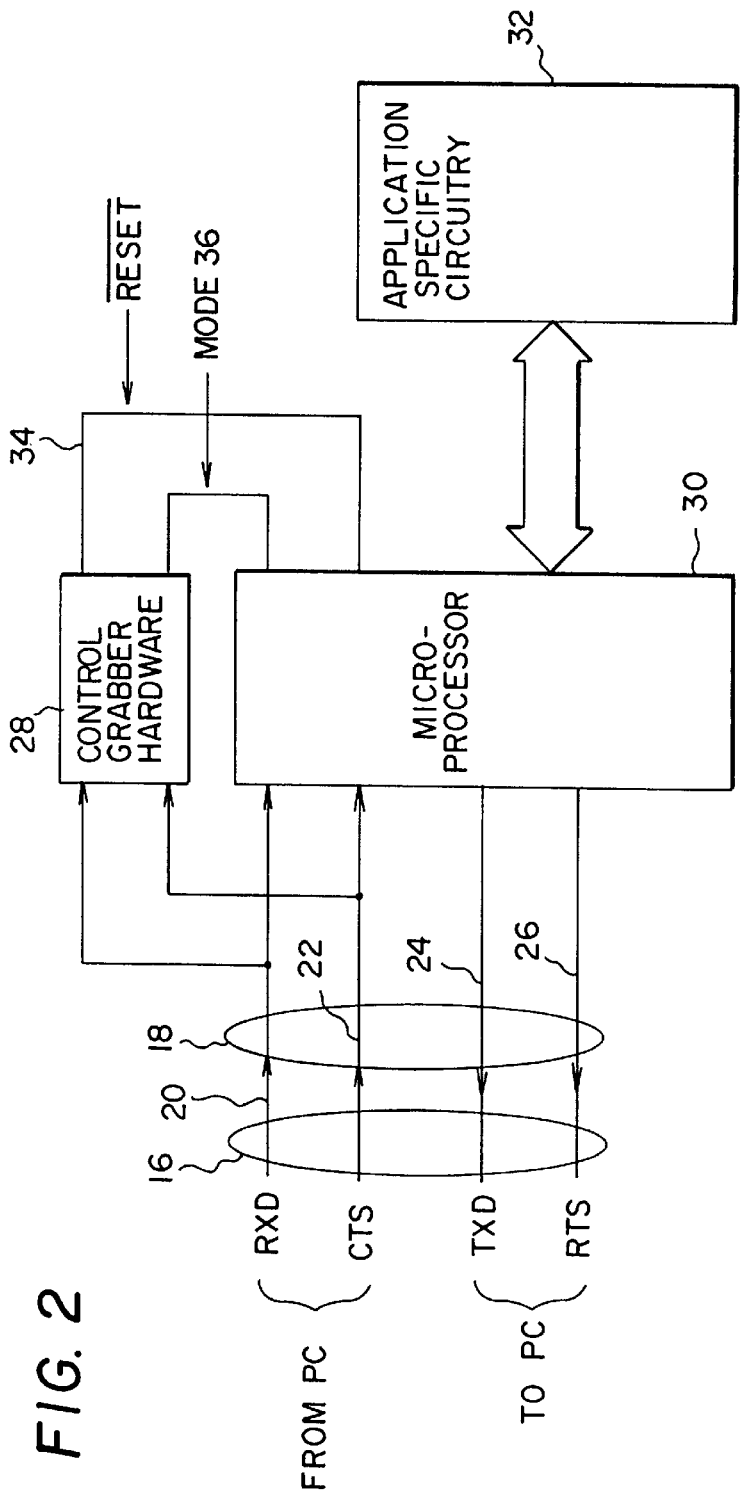
FIG. 2 shows a schematic view of a system for reprogramming a microprocessor according to the present invention.

FIG. 2 illustrates in block diagram form the connection from the serial port 18 to the control grabber hardware circuit 28 and microprocessor 30. Application specific circuitry 32 controls the printer or copier functions. Signals from the administrative computer 14 to the microprocessor are through the serial data line 20 and the data ready handshake line 22, both contained in serial cable 16. These connect to both the microprocessor 30 and to the control grabber hardware circuit element 28. The control grabber hardware circuit 28 sends two signals, RESET 34 and MODE 36, to microprocessor 30. The RESET line 34 resets the microprocessor, and the MODE line 36 determines the program to be executed. The serial data line 24 and handshake line 26 out of the microprocessor 30 carry signals to the administrative computer and are not required for this invention.

Figure 3:
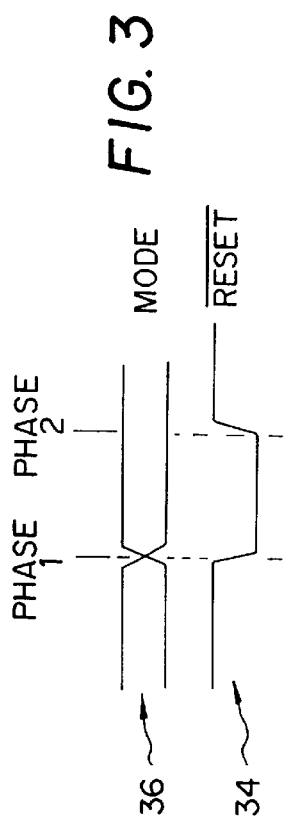
FIG. 3 shows a schematic of a phase control signal.

To force the microprocessor 30 to reset and execute the correct mode dependent code, the MODE signal 36 must be stable when the microprocessor is exiting reset 34. To insure that the MODE signal 36 is stable when reset is rescinded, a two phase control grabbing process is required, shown in FIG. 3. Phase 1 sets the MODE signal 36 to the reset condition. Phase two releases the reset condition while holding the MODE signal in the phase one state. This two phase process is required each time the mode is remotely changed or the microprocessor 30 is remotely reset.

Figure 4:
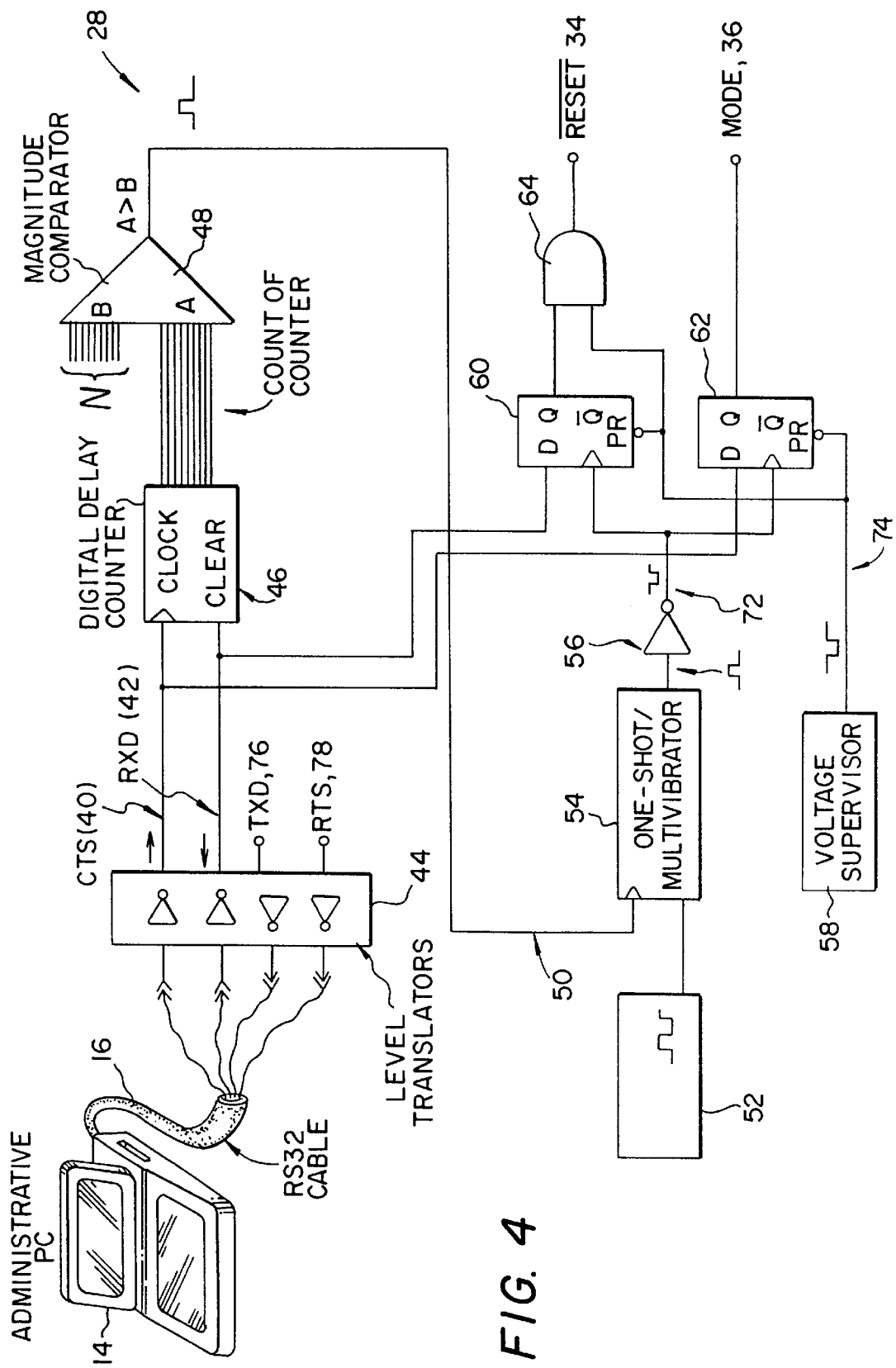
FIG. 4 shows a block diagram of a digital embodiment of a control grabber hardware circuit and interface to an administrative PC.

FIG. 4 shows a digital embodiment of the control grabber hardware 28. Each of the two phases previously described comprises a specific input sequence of the serial data input 42 and handshake line 40. This protocol sequence is specifically designed such that it cannot occur in a normal data transfer procedure. This is insured by holding the serial data line to the microprocessor in the break condition, which is normally used to signal an error or interrupt condition. In addition to the break condition, the handshake line from the administrative computer 14 must be cycled from a logic one to a logic zero "N" times during the break condition. Voltage level driver/receiver translator 44 converts the RS-232 analog voltage levels to logic ones or zeros for the received data 42 and handshake line 40. Output drivers convert the serial output data 76 and output handshake line 78 to RS-232 levels.

In the control grabber digital implementation, the administrative computer issues a logic zero break condition on serial data line 42 which allows digital counter 46 to count. The digital counter 46 is clocked by input handshake line 40. The counter counts to "N" or greater, as determined by the B input of magnitude comparator 48. A logic 1 state on the serial input data line 42 resets the counter, preventing an output from the magnitude comparator 48. When output 50 of magnitude comparator 48 goes to a logic 1, a one-shot pulse generator 54 fires. Digital oscillator 52 provides a timing signal for one shot multivibrator 54. The pulse generator output is inverted by inverter 56 which clocks the flip-flops 60 and 62. The one-shot pulse generator 54 gives the administrative computer time to change the states of the serial input data signal 42 and handshake line 40, which are the "D" inputs to the flip-flops 60 and 62. At the rising edge of the one-shot pulse 72, data at the "D" inputs of the flip-flops are clocked to their "Q" outputs. The output of flip-flop 60 and the output 74 of the microprocessor voltage supervisor circuit 58 is processed by AND gate 64 and the RESET signal 34 is sent to the microprocessor. The MODE signal 70 is determined by the state of the handshake line 40 prior to the rising edge clock 72 to the flip-flop 62.

In another embodiment of the present invention, control grabber hardware circuit 28 is comprised of elements to handle and log signals shown in FIG. 5. The two phases previously described comprise specific input sequence of serial data 84 and handshake line 86. Once again, this protocol sequence does not occur in normal data transfer procedures and is insured by holding the serial data line to the processor in the break condition, which is normally used to signal an error. In addition, the handshake line from the administrative PC must be cycled from a logic 1 to a logic 0N times during the break condition. The voltage level driver receiver translator 44 converts the RS-232 to logic 140 for received data 84 and handshake line 86.

In the analog embodiment of the control grabber, the administrative PC issues a logic zero break condition on serial data line 84 which opens analog switch 98 causing delay capacitor 94 to charge. A logic 1 on the serial data line 84 discharges the delay capacitor 94, reinitiating the control grabber sequence. The falling edge of handshake line 86 triggers a one-shot 90 pulse that turns on current source 92. The current pulse adds charge to delay capacitor 94, increasing its voltage. After many rapid current pulses, the delay capacitor voltage will be greater than the higher threshold voltage at the positive input of voltage comparator 102. Once the voltage comparator 102 output 108 goes to a logic zero, the comparator threshold is changed to a lower voltage by hysteresis resistor circuit 104 to eliminate chatter on the clock line 108 caused by the sawtooth nature of the delay capacitor charging and discharging. Resistor 96 provides slow discharge of the delay capacitor 94. The rising edge of the clock 108 latches the data at the "D" inputs of the flip-flops 110, 112 in a manner identical to the digital implementation.

FIGS. 7A–7F show a sequence of signal transmissions from an administrative computer 14 to a machine containing a microprocessor.

FIGS. 6A–6B show a normal RS-232 hardware handshaking data transmission. Receive data 130 from the administrative computer 14 or other subsystem to the microprocessor is shown transferring its data serially. As the microprocessor's capacity to accept the data is peaked, the handshake line to the administrative computer 14 is changed signaling it to stop transmitting data. Similarly, if the microprocessor is transmitting data to the administrative computer, and the capacity to receive the data is peaked, the handshake line 132 is changed to signal that its capacity to accept data has peaked. This shows that in a normal transmission of data, that the handshake line will change as the device's capacity to receive data is changed. A break condition is when the data line is held in a logic 0 condition for many character times 134. This is frequently used as an attention getting maneuver in many processes but by itself is not a sufficiently unusual occurrence. However, a break condition along with a rapid toggling of the handshake line 136 is a situation that would not occur in a normal data transmission to or from a device. The break condition 134 allows the digital counter 46 to count in the digital implementation or the delay capacitor 94 to charge in the analog implementation. The rapid toggling of the handshake line 136 provides the clock to increment the counter in the digital implementation or provides momentary pulses of charge to raise the voltage of the delay capacitor 138 in the analog implementation. As the delay capacitor charges in the analog implementation, the high threshold voltage 139 is crossed bringing the clock line 140 to a logic 0. The delay capacitor stops charging after the administrative computer ceases toggling the handshake line. The administrative computer then presents the data line 20 and the handshake line 22 to the microprocessor to the corresponding logic level desired to obtain the desired reset and mode conditions respectively. As the delay capacitor 94 discharges and crosses the lower threshold voltage 141 the clock line 140 rises clocking the receive data line 20 and handshake line 22 through the flip-flops to the microprocessor 142, 144.

Figure 8:
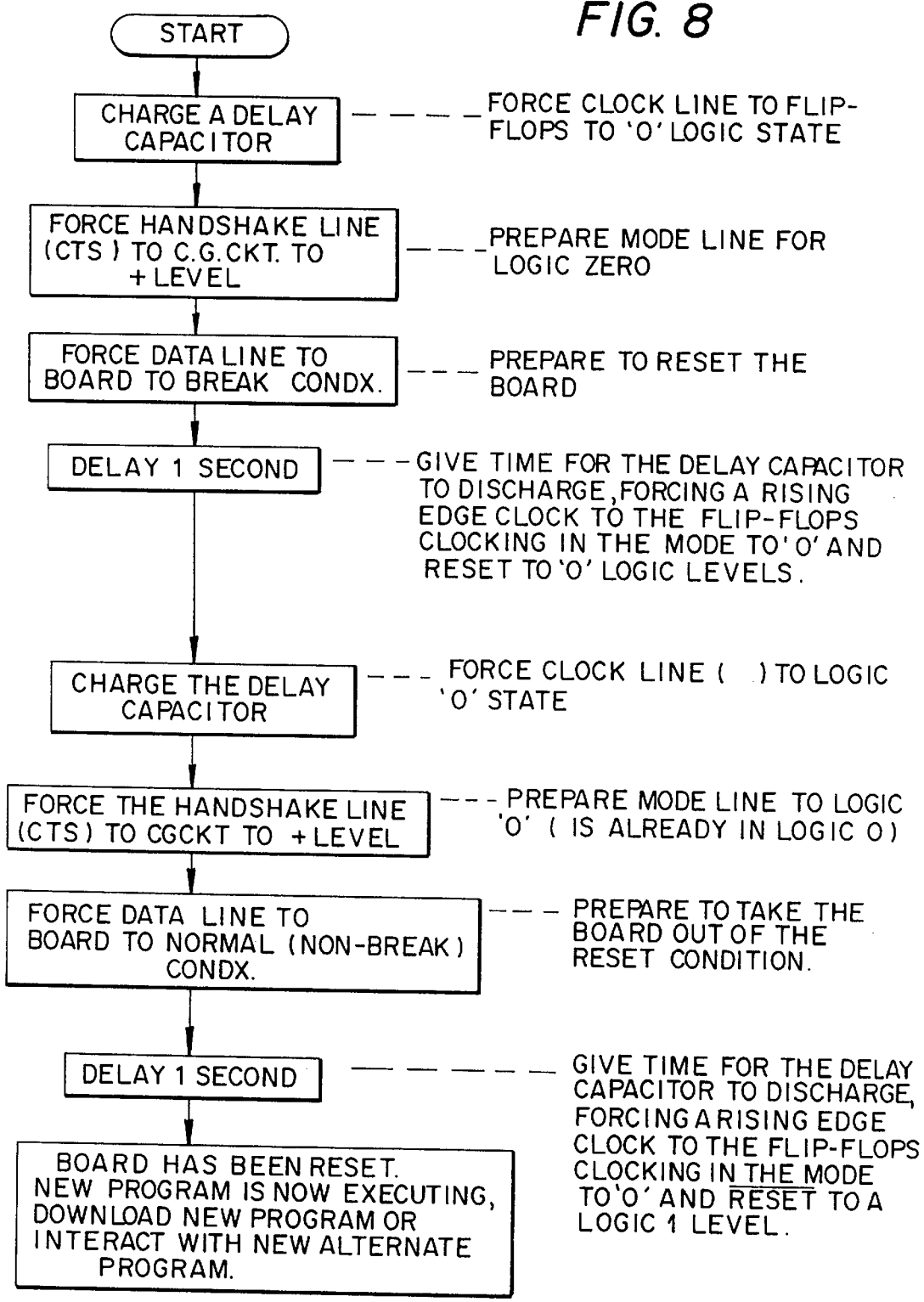
FIG. 8 shows an operational software flow chart executed by the administrative PC to force the remote microprocessor into a bootstrap mode.
Figure 9:
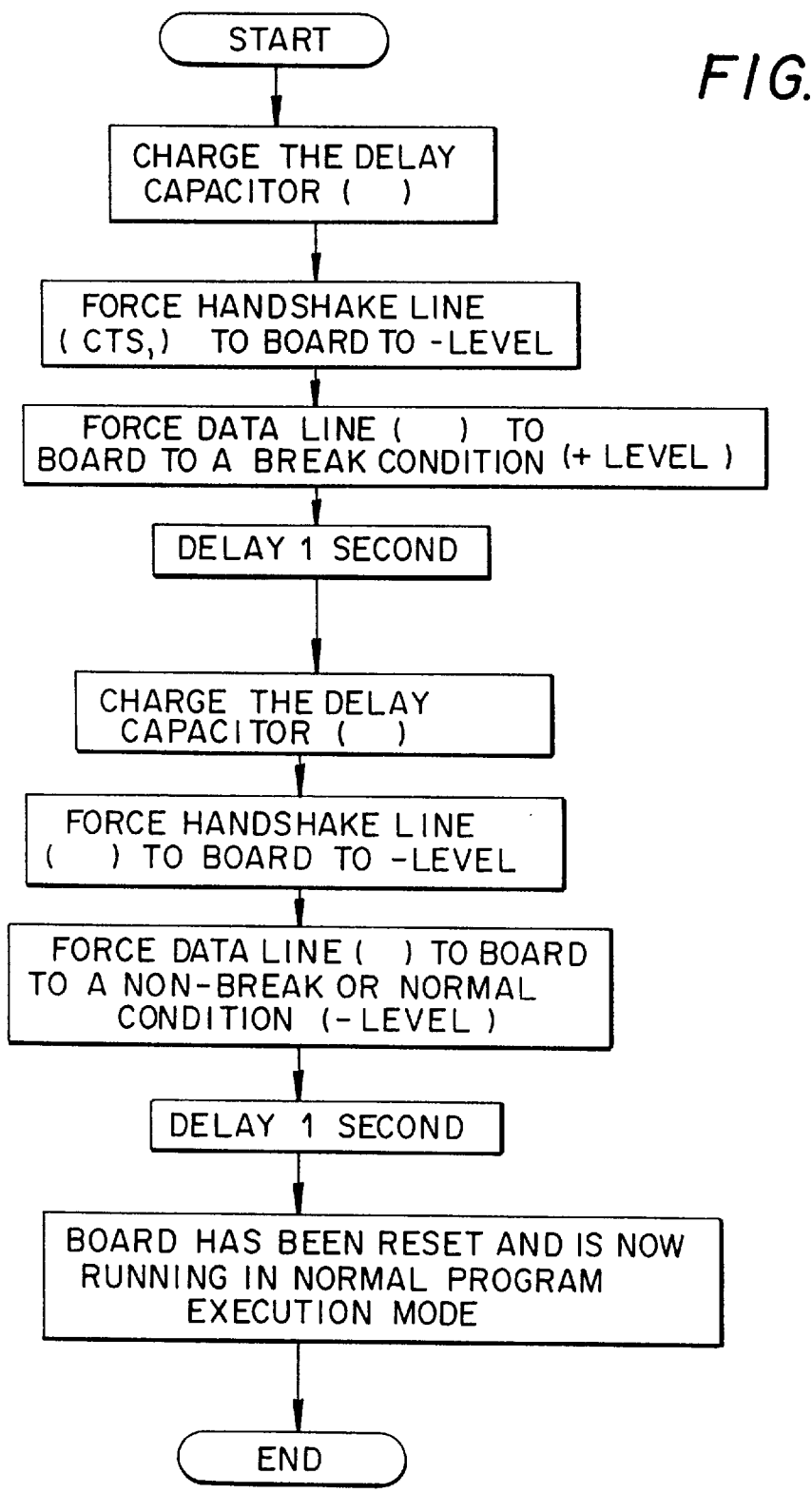
FIG. 9 shows an operational software flow chart executed by the administrative PC to force the remote microprocessor into the normal mode.

FIG. 8 shows a flow path for changing the mode of the microprocessor from the normal mode to the bootstrap mode. This chart is shown from the perspective of the, administrative PC or component subsystem that would be executing this program. This shows phase one of the sequence setting the mode and reset to the proper levels and also phase two of the sequence to rescind the reset condition. FIG. 9 is a flow chart for changing the microprocessor from bootstrap mode to normal mode. This is the same two phase process described in FIG. 8 except the mode line goes from the bootstrap condition to the normal condition.

Figure 10:
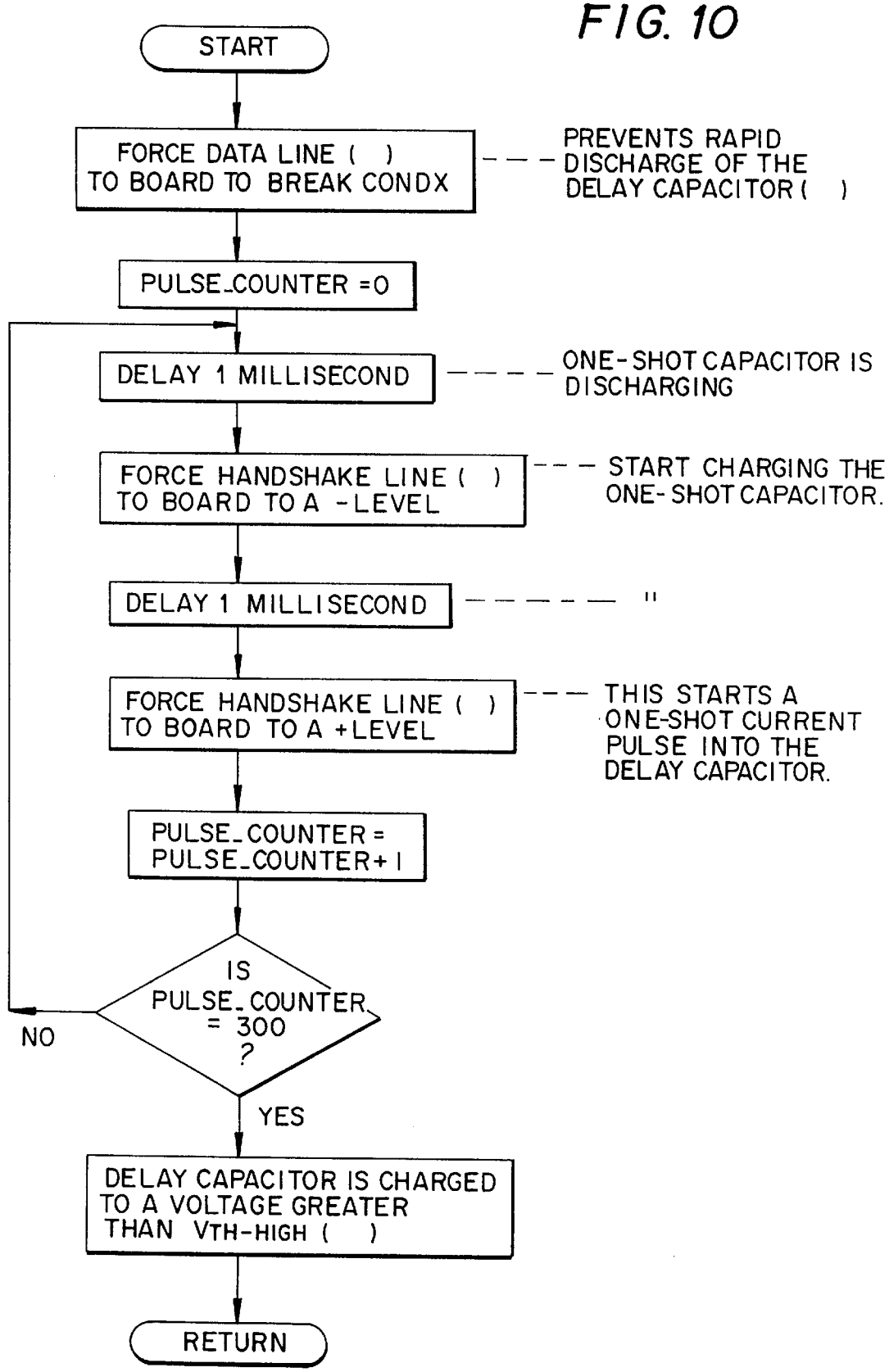
FIG. 10 shows an operational software flow chart executed by the administrative PC to charge a delay capacitor in an analog embodiment shown in FIG. 5.

FIG. 10 is a flow chart for charging the delay capacitor in the control grabber circuit for analog signals or for forcing the counter to count in the digital implementation. The function shown in this figure must be executed once in each phase of the control grabber circuit to perform its function. Time delays of one millisecond were chosen because it is the minimum time limit of a PC that is easily software programmable.

The advantages of the present invention over existing programming and diagnostic means are cost, simplicity, reliability, and use of an existing interface. Thus, the use of a costly floppy drive or tape drive to load data is avoided.

The invention has been described in detail with particular reference to preferred embodiments thereof, but it will be understood that variations and modifications can be affected within the spirit and scope of the invention. Descriptions were directed in particular to embodiments form part of, or cooperating more directly with, apparatus in accordance with the present invention. It is to be understood that elements not specifically shown or described may take various forms well to those skilled in the art. For example, although the term "microprocessor" has been used to describe the device that is being reprogrammed, EPROM chips or other memory devices incorporated in machines or electronic apparatus fall within the scope of the invention.

PARTS LIST

| | |
|---|---|
| 10. | System for reprogramming a microprocessor |
| 12. | Machine |
| 14. | Administrative PC |
| 16. | Serial cable |
| 18. | Serial cable port |
| 20. | Serial data line |
| 22. | Data ready handshake line |
| 24. | Serial data line |
| 26. | Handshake line |
| 28. | Control grabber hardware circuit |
| 30. | Microprocessor |
| 32. | Application circuitry |
| 34. | RESET signal |
| 36. | MODE signal |
| 37. | MODE signal |
| 38. | Reset |
| 40. | Handshake line |

PARTS LIST -continued

| | |
|---|---|
| 42. | Serial data input |
| 44. | Voltage level driver/receiver translator |
| 46. | Digital counter |
| 48. | Magnitude Comparator |
| 50. | Magnitude comparator |
| 52. | Digital oscillator |
| 54. | Pulse generator |
| 56. | Inverter |
| 58. | Microprocessor voltage supervisor circ |
| 60. | Flip-flop |
| 62. | Flip-flop |
| 64. | AND gate |
| 70. | MODE signal |
| 72. | One-shot pulse |
| 76. | Serial output data |
| 78. | Output handshake line |
| 84. | Serial data input |
| 86. | Handshake line |
| 90. | One-shot pulse |
| 92. | Current source |
| 94. | Delay capacitor |
| 96. | Resistor |
| 98. | Analog switch |
| 100. | Voltage |
| 102. | Voltage comparator |
| 104. | Hysteresis resistor |
| 108. | Clock line |
| 110. | Flip-flop |
| 112. | Flip-flop |
| 116. | AND gate |
| 140. | Logic |

I claim:

1. A method of reprogramming a microprocessor through a serial port comprising the steps of:

connecting an administrative computer to a serial cable;

connecting said serial cable to a serial port on a machine containing said microprocessor, wherein said serial port is electrically connected to said microprocessor;

sending a first sequence of signals from said administrative computer to said microprocessor to change said microprocessor from a normal mode to a bootstrap mode, said microprocessor being adapted to receive data in said bootstrap mode;

loading a new program from said administrative computer to said microprocessor; and sending a second sequence of signals from said administrative computer to said microprocessor to reset said microprocessor.

2. A method of reprogramming a microprocessor according to claim 1 further comprising the step of rescinding a reset signal prior to loading said new program.

3. A method of reprogramming a microprocessor according to claim 1 wherein said first sequence of signals is a break condition signal in conjunction with a rapid toggling of a handshake line signal.

4. A method of reprogramming a microprocessor through a serial port comprising the steps of:

connecting an administrative computer to a serial cable;

connecting said serial cable to a serial port on a machine containing said microprocessor, wherein said serial port is electrically connected to said microprocessor;

sending a first sequence of signals from said administrative computer to said microprocessor to activate a preinstalled program on said microprocessor;

transferring control of said microprocessor to said administrative computer;

loading a new program from said administrative computer to said microprocessor; and sending a second sequence of signals from said administrative computer to said microprocessor to reset said microprocessor.

5. A method of reprogramming a microprocessor through a serial port comprising the steps of:

connecting an administrative computer to a serial cable;

connecting said serial cable to a serial port on a machine containing a microprocessor, wherein said serial port is connected to said microprocessor;

sending a first sequence of signals from said administrative computer to a control grabber hardware circuit;

sending a second sequence of signals from said control grabber hardware circuit to said microprocessor to change said microprocessor from a normal mode to a bootstrap mode said microprocessor being adapted to receive data in said bootstrap mode;

loading a new program from said administrative computer to said microprocessor;

sending a third sequence of signals from said administrative computer to said control grabber hardware circuit; and sending a forth sequence of signals from said control grabber hardware circuit to change said microprocessor from said bootstrap mode to said normal mode.

6. An apparatus containing a microprocessor capable of being reprogrammed through a serial port comprising:

a microprocessor contained in said apparatus;

electrical connections between said serial port and said microprocessor; and a control grabber hardware circuit connected to both said serial port and said microprocessor wherein a sequence of signals received by said control grabber hardware circuit through said serial port causes said control grabber hardware circuit to send a signal to said microprocessor, changing said microprocessor from a normal mode to a bootstrap mode, said microprocessor being adapted to receive data in said bootstrap mode.

7. An apparatus as in claim 6 wherein a new program is transmitted through said serial port to said microprocessor while said microprocessor is in said bootstrap mode.

8. An apparatus as in claim 7 wherein a sequence of signals is sent through said serial port to said control grabber hardware circuit after said new program has been loaded on said microprocessor causing said microprocessor to change from said bootstrap mode back to said normal mode.

* * * * *